United States Patent [19]

Kunschke et al.

[11] Patent Number: 4,879,871
[45] Date of Patent: Nov. 14, 1989

[54] BEACH COMBING APPARATUS

[76] Inventors: Eldor W. Kunschke, 149 S. Shioc St., Bonduel, Wis. 54107; Lee Nernberger, Rte. 1, Box 25, Cecil, Wis. 54111

[21] Appl. No.: 268,563

[22] Filed: Nov. 7, 1988

[51] Int. Cl.⁴ .......................... A01B 1/22; A01D 1/00
[52] U.S. Cl. .................................. 56/239; 56/400.05; 30/317; 172/360; 172/361; 172/720
[58] Field of Search ............... 56/229, 239, 400.04, 56/400.05, 400.06, 400.07; 30/170, 317, DIG. 5; 172/351, 360, 361, 362, 698, 720

[56] References Cited

U.S. PATENT DOCUMENTS

| | | | |
|---|---|---|---|
| 407,571 | 7/1889 | Calef | 30/317 |
| 761,850 | 6/1904 | Hook | 30/317 |
| 827,542 | 7/1906 | Lawson | 56/400.04 |
| 1,855,202 | 4/1932 | Richmond | 30/317 |
| 1,926,973 | 9/1933 | Donolo | 172/720 |
| 2,248,421 | 7/1941 | Bouton | 172/720 |
| 2,432,035 | 12/1947 | Noble | 172/720 |
| 2,519,766 | 8/1950 | Johnson | 30/317 |
| 2,635,336 | 4/1953 | Seymour | 30/317 |
| 2,873,809 | 2/1959 | Loomis | 172/720 |
| 3,280,457 | 10/1966 | Lewis | 30/317 |
| 4,484,635 | 11/1984 | Sidlo | 172/360 |

Primary Examiner—Stephen J. Novosad
Assistant Examiner—Terry Lee Melius
Attorney, Agent, or Firm—Leon Gilden

[57] ABSTRACT

A beach combing apparatus is set forth wherein a plurality of spaced runners have secured therebetween an elongate blade member formed with a forwardly positioned beveled planar blade formed with a spaced parallel rear overfolded edge to provide strength and integrity to said blade. A plurality of spaced parallel upstanding brackets integrally formed to said blade to secure an elongate "U" shaped handle is mounted between the brackets at terminal end portions integrally formed to said handle at an obtuse angle thereto whereupon said handle is oriented relative to said blade member at an angle of approximately 30 to 45 degrees in a first position and pivotal parallel to said blade member in a second position to effect the cutting and trimming of various growth to be found growing on a beach surface.

4 Claims, 3 Drawing Sheets

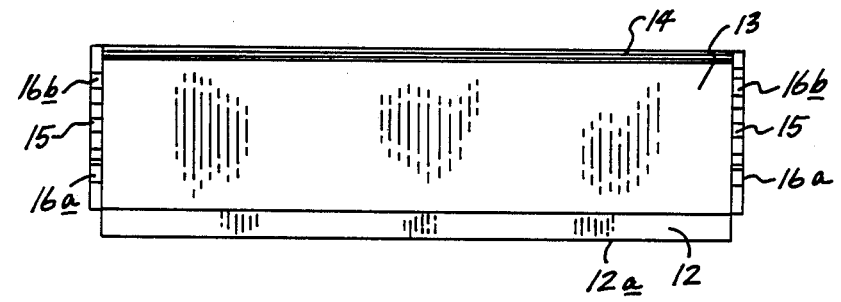
FIG 5
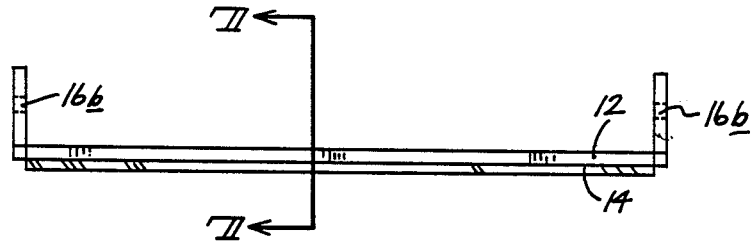
FIG 6
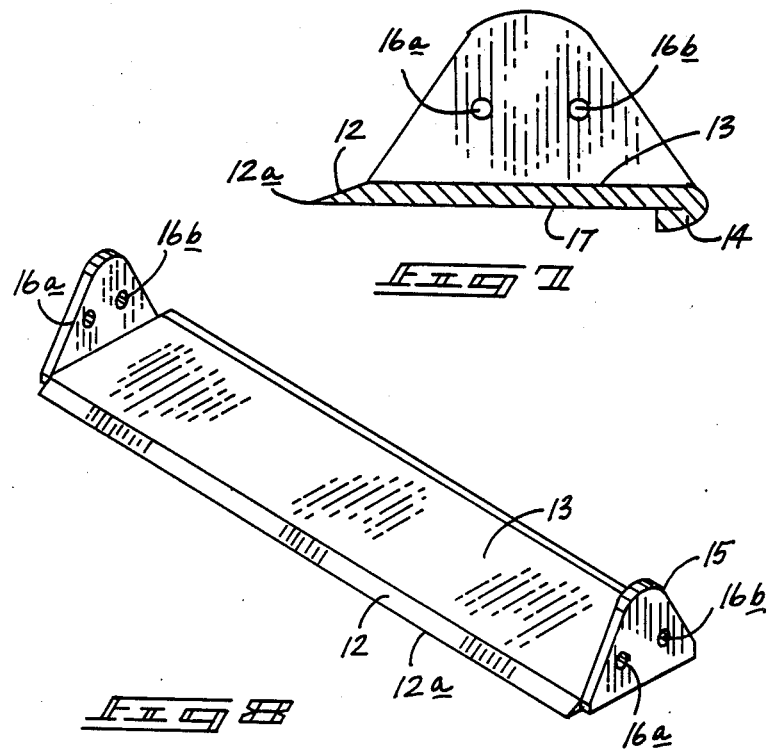
FIG 7
FIG 8

BEACH COMBING APPARATUS

FIELD OF THE INVENTION

The field of invention relates generally to beach cleaning equipment and more particularly pertains to a new and improved beach combing apparatus that enables the trimming and removal of various plant life growing and obstructing beach use.

DESCRIPTION OF THE PRIOR ART

The use of apparatus for the trimming and grooming of beaches has been utilized in the prior art, but have generally been of rudimentary construction such as the use of the scythe in the trimming of such plant life and various other one-armed implements. The shortcomings of such implements is the inability to properly maintain a consistent cutting and trimming of such plant life and furthermore due to the striking of the sand itself during the cutting operation, the implement is quickly dulled requiring excessive maintenance and attention. For example, prior art devices that have been utilized may be found in U.S. Pat. No. 407,571 to Calef as an early example of a one-armed implement in use wherein a corn and plant cutter has provided with an upwardly oriented loop and a lowerly positioned handle along a single rod formed with a cutting hook at a lower terminal portion of the rod to enable the typical swinging of the rod and the cutting of vegetation therewith. The shortcomings of this, as well as other prior art patents, may be readily apparent as per the dulling and rapid wear of such devices as they strike typical beach sand and further the manipulation of such devices to maintain a consistent cutting height of beach plant life during a cutting operation.

U.S. Pat. No. 1,855,202 to Richmond sets forth a somewhat improved one-armed type swinging device for use in cutting wherein a handle has formed on angulated support rod downwardly extending to a pivotally mountable leg for use in operation in a chopping stroke wherein the device may be of a relatively snag-free operation by thrusting the implement forward when snagged in a cutting procedure whereupon the blade will fold coextensively and overlying the handle support and may be readily removed for a further chopping stroke.

U.S. Pat. No. 2,519,766 to Johnson sets forth a debris cutting knife for use in the chopping of vegetable trash and the like wherein a simplistic loop handle has formed an elongate support rod thereto with a generally angularly oriented cutting hook at a distant terminal end of said rod for the chopping and removal of unwanted plant trash.

U.S. Pat. No. 2,635,336 to Seymour sets forth a garden-type cutting tool wherein an elongate flexible blade formed of a thin flat cross-section that has formed thereto a rounded end opposed to an associated handle with a plurality of slots inclined towards the end of the blade with the lower edge of said slots being formed as cutting edges that are bent alternately to form cutting elements in opposed sides of the blade. The Seymour patent is merely a variation of the one-armed type chopping and cutting tools and is of a relatively remote structure and functional organization relative to the instant invention.

U.S. Pat. No. 3,280,457 to Lewis is merely a further example of a single rod supported blade wherein a generally "U" shaped support for cutting blade has a cutting edge formed to an interior portion of one of the "U" shaped legs with an elongate handle extending therefrom wherein a plant of excess diameter may be oriented between the legs of the blade and the blade pivoted to sever and cut the weed.

As may be appreciated therefore, there is a continuing need for a new and improved beach combing apparatus as set forth in the instant invention which addresses both the problems of effectiveness and ease of use and maintenance and in this respect, the present invention substantially fulfills this need.

SUMMARY OF THE INVENTION

In view of the foregoing disadvantages inherent in the known types of cutting implements now present in the prior art, the present invention provides an beach combing apparatus wherein the same may be efficiently and effectively drawn over an associated beach surface on cylindrical skids and may be effectively utilized for extensive periods without undue maintenance. As such, th general purpose of the present invention, which will be described subsequently in greater detail, is to provide a new and improved beach combing apparatus which has all the advantages of the prior art plant cutting tools and none of the disadvantages.

To attain this, the present invention comprises an elongate planar-like blade formed with a downwardly beveled and directed forward cutting edge with a parallel rearwardly extending overfolded edge to provide strength and integrity to said blade wherein said blade has formed thereto a plurality of upstanding orthogonal brackets at terminal sides thereof sandwiched between and pivotally securable to a handle formed with an upwardly extending loop and downwardly terminal end portions formed at an obtuse angle to said handle a plurality of skids mounted exteriorly to said brackets of generally cylindrical cross-section with upturned forward and rearward ends to provide ease of traverse of said invention across a beach surface.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spririt and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved beach combing apparatus which has all the advantages of the prior art beach combing apparatus and none of the disadvantages.

It is another object of the present invention to provide a new and improved beach combing apparatus which may be easily and efficiently manufactured and marketed.

It is a further object of the present invention to provide a new and improved beach combing apparatus which is of a durable and reliable construction.

An even further object of the present invention is to provide a new and improved beach combing apparatus which is susceptible of a low cost of manufacture with regard to both materials and labor, and which accordingly is then susceptible of low prices of sale to the consuming public, thereby making such beach combing apparatus economically available to the buying public.

Still yet another object of the present invention is to provide a new and improved beach combing apparatus which provides in the apparatuses and methods of the prior art some of the advantages thereof, while simultaneously overcoming some of the disadvantages normally associated therewith.

Still another object of the present invention is to provide a new and improved beach combing apparatus formed of an elongate blade secured to a handle at an appropriate predetermined angle to maintain said blade at a desired orientation relative to a beach surface to effectively cut and remove unwanted plant growth along said beach surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a top orthographic view of the cutting member of the instant invention.

FIG. 6 is a front orthographic view taken in elevation of the instant invention.

FIG. 7 is an orthographic view taken along the lines 7—7 of FIG. 6.

FIG. 8 is an isometric illustration of the cutting member of the instant invention.

DESCRIPTION OF THE PREFERRED EMBODIMENT

Figure 1:
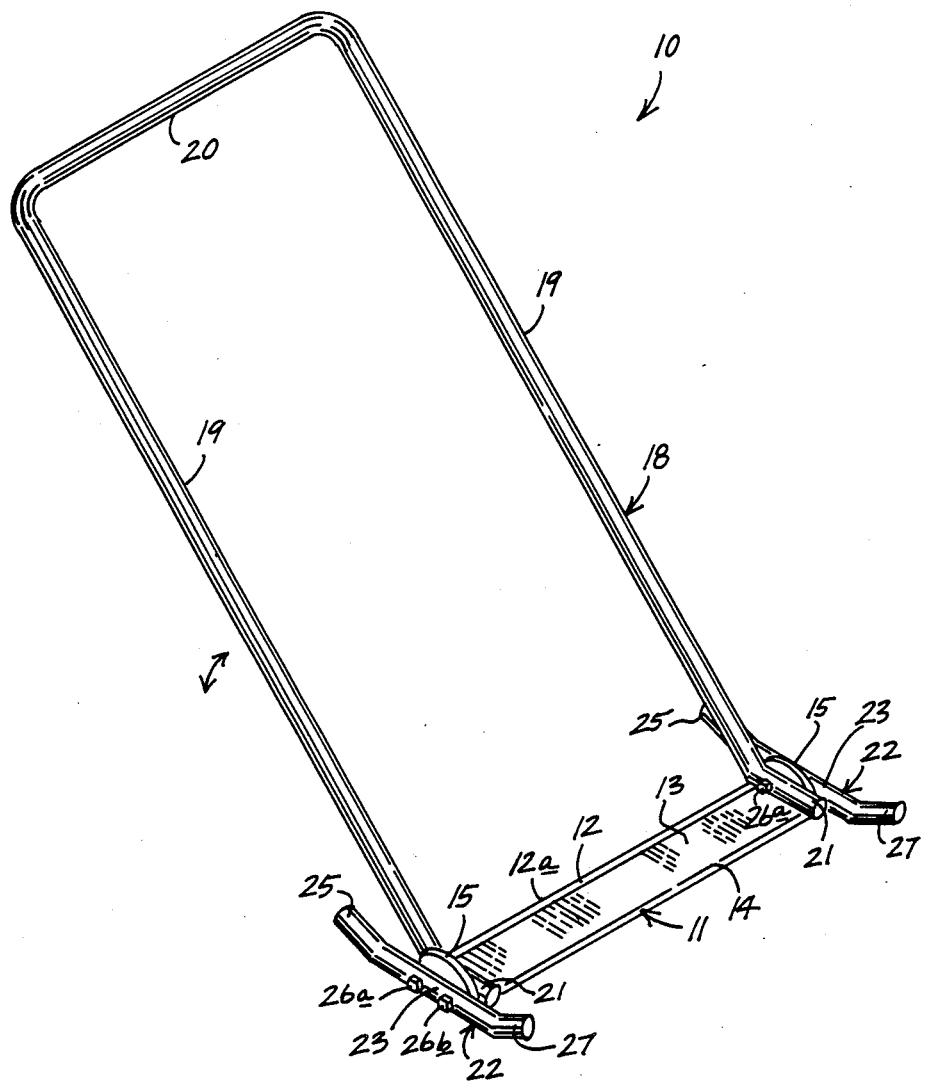
FIG. 1 is an isometric illustration of the instant invention.
Figure 2:
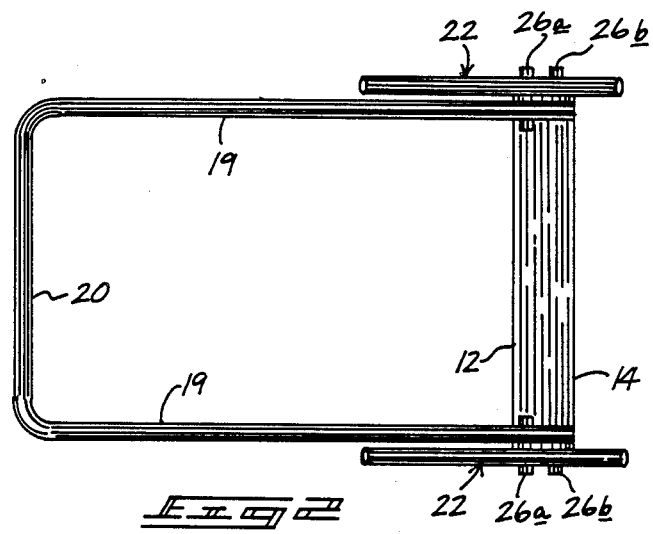
FIG. 2 is a top orthographic view of the instant invention.

With reference now to the drawings, and in particular to FIGS. 1 to 8 thereof, a new and improved beach combing apparatus embodying the principles and concepts of the present invention and generally designated by the reference numeral 10 will be described.

More specifically, the beach combing apparatus 10 essentially comprises a cutting member 11 secured between a handle 18 and an outwardly mounted plurality of skids 22.

The cutting member 11 is formed with a downwardly directed cutting blade bevel 12 from upper planar surface 13 terminating in a forward cutting blade edge 12a coextensive with lower planar surface 17 parallel to upper planar surface 13 of the cutting member 11. An overfolded rear terminal edge seam 14 is formed parallel to blade edge 12a spaced therefrom to provide rigidity and integrity to the cutting member 11 and furthermore form a rounded surface for ease of directing the beach combing apparatus 10 in a first direction over plant matter to be cut and thereafter enable a second direction in the direction of cutting edge 12a to thereafter cut the plant matter. In this manner, the smooth forward surface formed by overfolded edge 14 enables a smooth forward motion of the beach combing apparatus prior to a rearward cutting motion. Furthermore, the overfolded seam 14 is overfolded onto the lower planar surface 17 and spaced above the lower surface of skids 22. The overfolded edge 14 secured to the lower surface 17 is further significant in that the free edge of the overfolded seam 14 does not present an obstruction to grass clippings passing over the top surface 13 of the blade member 11 and in its underlying position above the bottom surface of skids 22, does not present an obstruction in the cutting of the blade 12 as it is pulled across a beach surface.

Figure 3:
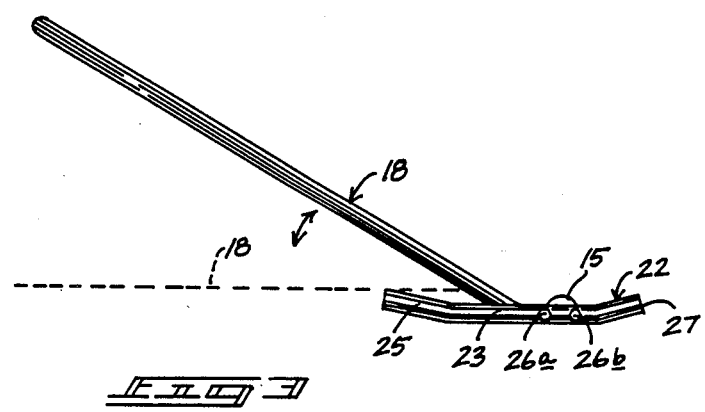
FIG. 3 is an orthographic view taken in elevation of the instant invention.
Figure 4:
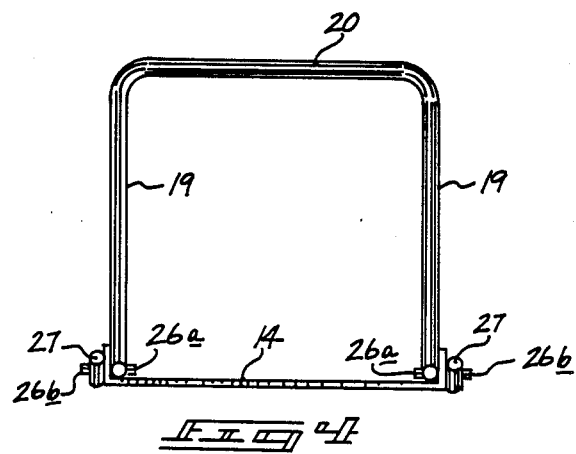
FIG. 4 is a frontal orthographic view of the instant invention.

Orthogonally and terminally formed to the cutting member 11 at its side terminal edges are a plurality of upstanding brackets 15 formed with respective first and second through-extending aligned apertures 16a and 16b orthogonally formed to the bracket 15. Second apertures 16b threadedly accepts second threaded connectors 16b, while first apertures 16a accept through-extending first connectors 26a securing the handle 18, the blade member 11 and the skids 22 together. The first connectors 26a, however, allow pivotment of the handle 18 relative to the blade member 11 to enable the handle 18 to pivot downwardly to a second postion to minimize application of a moment arm of force about the blade member 11 when the handle 18 is in a second downwardly pivoted position and provide a smooth pulling action of the aparatus above a beach surface. FIG. 3 illustrates the second position of the handle 18 and its parallel orientation relative to the upper surface 13 of the blade member 11 during a pulling action.

Handle member 18 is formed of a generally "U" shaped configuration with a plurality of downwardly extending parallel legs 19 integrally formed to a grip bar 20. The grip bar 20 is oriented generally parallel to the cutting edge 12a. The handle 18 has formed terminal end portions 21 integral to respective leg ends 19 and formed at an obtuse angle thereto and oriented in a relationship generally parallel to the upper and lower planar surfaces 13 and 17 of the cutting member 11 in a first position limiting upward pivotment of handle 18 in said first position.

The skid members 22 are secured exteriorly to brackets 15 and are formed with a central cylindrical support rod 23 of cylindrical configuration to minimize friction and drag across a beach surface and formed with a plurality of through-extending apertures for securement of the skids 22 to upstanding brackets 15. Threaded connectors 26a and 26b secure the cutting member 11, the handle 18, and the skid 22 together. The central support rods 23 of the skids 22 are formed with a forward upturned end 25 of a length somewhat greater than the rear upturned ends 27 as the need to minimize friction and binding of the apparatus 10 that is somewhat greater when pulled in a cutting motion as opposed to being pushed in a first motion prior to the cutting act.

As to the manner of usage and operation of the instant invention, the same should be apparent from the above description. In use, the handle 18 is grasped by means of the grip bar 20 and pivoted to a second position wherein the legs 19 are generally parallel to the upper and lower surfaces 13 and 17 of the cutting member 11. A first or forward pulling motion is effected to pull the blade member 11 in a direction to effect cutting of beach growth by means of the cutting edge 12a and thereafter the handle 18 will return in a first upper position to enable manipulation of the apparatus 10 for subsequent cutting.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scpoe of the invention.

What is claimed as being new and desired to be protected by Letters Patent of the United States is as follows:

1. A beach combing apparatus comprising,
    an elongate cutting edge coextensive along a forward side of an elongate planar central support, and said cutting edge directed outwardly of said central support, and
    a curvilinear overfolded end formed coextensively along a rear edge of said central support and spaced parallel from said cutting edge at the other side of said cutting means to present a smooth non-binding surface directed outwardly of said cutting means in the direction opposite to that of said cutting edge, and
    a plurality of elongate skid members wherein each skid member is secured to each end of said elongate cutting means and each skid member aligned orthogonally to said cutting edge and to said non-binding surface of said curvilinear overfolded end, and each skid member formed with a central body aligned with the central support and intersecting a plane defined by the central support with an upturned forward end aligned with said central support at an obtuse angle thereto and oriented in a like direction as said cutting edge, and a rear upturned end aligned with said central support and oriented opposite the direction of said cutting edge, and
    upstanding brackets are integrally and orthogonally secured relative to said central support at terminal ends of said central support orthogonal to and defining terminal ends bounding said cutting edge and said curvilinear surface wherein said brackets are formed with a plurality of through-extending apertures, and
    a handle means including spaced terminal end portions each mounted to one of said brackets overlying said central support, and
    wherein said terminal end portions limit upward pivotment of said handle means relative to said cutting means upon engagement with an upper surface of said central support, and each of said skid members secured to an exterior surface of a bracket and each terminal end portion of the handle secured to an interior surface of a respective bracket, and said central support includes a lower planar surface coextensive and terminating in said cutting edge at one side thereof and terminating and accepting a free edge of said overfolded edge of said curvilinear end at a spaced side, and said central support formed with an upper planar surface free of obstruction terminating with a bevel directed downwardly to said cutting edge along one side and terminating in said overfolded end forming a curvilinear surface parallel to and spaced from said cutting edge on said spaced side.

2. A beach combing apparatus as set forth in claim 1 wherein said skid means are formed of a cylindrical cross-section.

3. A beach combing apparatus as set forth in claim 2 wherein said central body of each skid member has formed a plurality of openings aligned with said through-extending aperture of said brackets for securement of said central body to a respective bracket of said central support including a first threaded member securing a respective skid means to a respective bracket and terminal end of said handle means and a second threaded member securing only a respective skid to respective bracket.

4. A beach combing apparatus as set forth in claim 3 wherein said handle means is formed with a generally "U" shaped member with a grab bar oriented parallel to said cutting edge and said curvilinear surface with orthogonally and integrally formed downwardly depending legs wherein each leg has formed thereto at its terminal end, one of said terminal ends of said handle means formed at an obtuse angle to each respective leg wherein each terminal end is positioned interiorly of a respective bracket and provided with a through-extending aperture to pivotally secure said cutting means to said handle means by said first threaded member, wherein said handle means is pivoted from a first position wherein said legs are at an obtuse angle to said central support of said cutting means, to a second position wherein the legs of said handle means are generally parallel to said central support.

* * * * *